United States Patent [19]

Wada

[11] Patent Number: 5,850,573
[45] Date of Patent: Dec. 15, 1998

[54] CONTROL METHOD FOR PERIPHERAL DEVICE IN HOST COMPUTER CONNECTABLE TO A PLURALITY OF PERIPHERAL DEVICES

[75] Inventor: Yoshihiro Wada, Tokyo, Japan

[73] Assignee: Canon Kabushiki Kaisha, Tokyo, Japan

[21] Appl. No.: 345,334

[22] Filed: Nov. 21, 1994

Related U.S. Application Data

[63] Continuation of Ser. No. 742,860, Aug. 8, 1991, abandoned.

[30] Foreign Application Priority Data

Aug. 16, 1990 [JP] Japan .................................. 2-215032
Aug. 16, 1990 [JP] Japan .................................. 2-215033
Aug. 30, 1990 [JP] Japan .................................. 2-226581

[51] Int. Cl.$^6$ .................................................. G06F 13/00
[52] U.S. Cl. ........................ 395/882; 395/835; 395/561; 395/500
[58] Field of Search ................................... 395/500, 250, 395/834, 835, 681, 882, 566, 561, 114, 115

[56] References Cited

U.S. PATENT DOCUMENTS

| | | | |
|---|---|---|---|
| 4,775,931 | 10/1988 | Dickie et al. ............................ | 395/829 |
| 5,129,072 | 7/1992 | Larner et al. ............................ | 395/868 |
| 5,131,082 | 7/1992 | Bonevento et al. ..................... | 395/825 |
| 5,179,666 | 1/1993 | Rimmer et al. ......................... | 395/882 |
| 5,191,655 | 3/1993 | Sarkissian .............................. | 395/824 |
| 5,204,951 | 4/1993 | Keener et al. .......................... | 395/294 |
| 5,214,761 | 5/1993 | Barrett et al. .......................... | 395/884 |
| 5,257,393 | 10/1993 | Miller ................................. | 395/200.54 |
| 5,283,872 | 2/1994 | Ohnishi ................................. | 395/309 |
| 5,287,463 | 2/1994 | Frame et al. ........................... | 395/285 |
| 5,317,693 | 5/1994 | Cuenod et al. ......................... | 395/829 |
| 5,404,524 | 4/1995 | Celi, Jr. ................................ | 395/652 |
| 5,404,548 | 4/1995 | Nishioka ............................... | 395/872 |
| 5,459,867 | 10/1995 | Adams et al. ......................... | 395/681 |
| 5,487,160 | 1/1996 | Bemis ................................... | 395/114 |

FOREIGN PATENT DOCUMENTS 2204163 11/1988 United Kingdom .

*Primary Examiner*—Zarni Maung
*Attorney, Agent, or Firm*—Fitzpatrick, Cella, Harper & Scinto

[57] ABSTRACT

A method of loading a program on a host computer connectable to a plurality of peripheral devices includes inquiring a device type of a peripheral device connected thereto, knowing the type of the peripheral device by receiving a response to an inquiry, and loading a control program corresponding to the type.

6 Claims, 14 Drawing Sheets

FIG.7

| 0 | OPERATION CODE (12H) | | |
|---|---|---|---|
| 1 | LUN (0) | 0 | |
| 2 | 0 | | |
| 3 | 0 | | |
| 4 | ALLOCATION LENGTH (36) | | |
| 5 | 0 | 0 | FLAG (0) | LINK (0) |

FIG.8

| 0 | 0 | PERIPHERAL DEVICE TYPE |
|---|---|---|
| 1 | | 0 |
| 2 | | 0 |
| 3 | | 0 |
| 4 | | ADDITIONAL LENGTH (31) |
| 5 | | 0 |
| 6 | | 0 |
| 7 | | 0 |
| 8<br>15 | | VENDOR IDENTIFICATION<br>("XXXXX") |
| 16<br>31 | | PROUCT IDENTIFICATION<br>("TYPE-A") |
| 32<br>35 | | PRODUCT REVISION LEVEL<br>("1.01") |

FIG.9

| TYPE CODE | CONTENTS |
|---|---|
| 0 0 | DIRECT ACCESS DEVICE |
| 0 1 | SEQUENTIAL ACCESS DEVICE |
| 0 2 | PRINTER DEVICE |
| 0 3 | PROCESSOR DEVICE |
| 0 4 | SINGLE WRITE IN MULTI READ DEVICE |
| 0 5 | READ ONLY DIRECT ACCESS DEVICE |
| 0 6 | SCANNER DEVICE |
| 0 7 | LIGHT MEMORY DEVICE |
| 0 8 | CHANGER DEVICE |
| 0 9 | COMMUNICATION APPARATUS |

FIG.12A

| 0 | OPERATION CODE (2AH) | | |
|---|---|---|---|
| 1 | LUN (0) | 0 | |
| 2 | TRANSFER DATA TYPE (80H) | | |
| 3 | 0 | | |
| 4 | TRANSFER IDENTIFICATION (0) | | |
| 5 | | | |
| 6 | TPANSFER LENGTH (13) | | |
| 7 | | | |
| 8 | | | |
| 9 | 0 | 0 | FLAG(0) | LINK(0) |

FIG.12B

| 0 | OPERATION INSTRUCTIONS (01) |
|---|---|
| 1 | READ DENSITY |
| 2 | READ RESOLUTION |
| 3 | |
| 4 | READ MAGNIFICATION |
| 5 | MAIN SCAN WIDTH |
| 8 | |
| 9 | SUB SCAN LENGTH |
| 12 | |

FIG. 15

TRANSFER DATA TYPE

00H IMAGE READ(READ)
80H PROGRAM READ

| | BIT 7 | | | | | | | BIT 0 |
|---|---|---|---|---|---|---|---|---|
| 0 | OPERATION CODE (28H) | | | | | | | |
| 1 | LUN (O) | | | 0 | | | | |
| 2 | TRANSFER DATA TYPE | | | | | | | |
| 3 | | | | 0 | | | | |
| 4 | TRANSFER IDENTIFICATION (O) | | | | | | | |
| 5 | | | | | | | | |
| 6 | TRANSFER LENGTH | | | | | | | |
| 7 | | | | | | | | |
| 8 | 0 | | | | | | | 0 |
| 9 | 0 | | | | | | FLAG (O) | LINK (O) | ations 5,850,573

CONTROL METHOD FOR PERIPHERAL DEVICE IN HOST COMPUTER CONNECTABLE TO A PLURALITY OF PERIPHERAL DEVICES

This application is a continuation of application Ser. No. 07/742,860, filed Aug. 8, 1991, now abandoned.

BACKGROUND OF THE INVENTION

1. Field of the Invention

The present invention relates to a control method of peripheral device in a host side and a peripheral device side in a system comprising a host computer connectable to a plurality of peripheral devices, and peripheral devices connected to the host comuter.

2. Related Background Art

Conventionally, in an information processing system composed of a host computer and a plurality of peripheral devices connected thereto, the host computer uses different programs for each device, and each device type, to control each peripheral device.

Thus, on the host side, in order to cope with a variety of devices or device types connectable therewith, it has been commonly practiced to prepare many programs in an external storage unit such as a hard disk, thereby allowing the operator to determine and select an appropriate program among many programs in accordance with a system configuration, and load it into an internal memory in the host computer.

Also, it has been practiced that when parameters for controlling a peripheral device can be set with switches on the peripheral device side, the operator must set the same values by inputting them into the host computer, to reflect those setting values to the controls on the host side.

However, to perform the above operations, the operator must have a large amount of knowledge in connection with peripheral devices and control programs thereof. Further, the operations for confirming what type of device is being connected, and selecting and loading an appropriate program, or inputting and setting the values set on the device side into the host computer were a burden on the operator.

SUMMARY OF THE INVENTION

An object of the present invention is to provide an information processing system allowing the operator to load an appropriate program in a simple manner, without the needs of examining what peripheral device is connected to the host computer, and determining and selecting a program to be loaded in accordance with that result.

Another object of the present invention is to provide an information processing system capable of reflecting the information set on the peripheral device side to the controls on the host computer side.

According to one aspect, the present invention which achieves these objectives relates to a method of loading a program on a host computer connectable to a plurality of peripheral devices, comprising the step of inquiring a device type of a peripheral device connected thereto, knowing the type of the peripheral device by receiving a response to the inquiry, and loading a control program corresponding to the type.

According to another aspect, the present invention which achieves these objectives relates to a method of controlling a peripheral device in a host computer connectable to a plurality of peripheral devices, comprising the step of requesting a peripheral device connected thereto to transfer a peripheral device control program for the host computer stored in the peripheral device, storing the program which is transferred in accordance with the request, and controlling the peripheral device with the program.

According to still another aspect, the present invention which achieves these objectives relates to a method of controlling a peripheral device to set control parameters on a host computer connectable to a plurality of peripheral devices, comprising the step of operating an operation unit on the peripheral device, determining the control parameters by reading operation results on the operation unit, receiving a request for transferring the control parameters, and transferring the determined control parameters with the request.

Other objectives and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 7 is a table showing a format of the INQUIRY command.

FIG. 8 is a table showing a format of the sense data.

FIG. 9 is a table showing the contents for the type code of peripheral device.

FIGS. 12A and 12B are tables showing formats of the SEND command.

FIG. 15 is a table showing a format of the READ command.

DETAILED DESCRIPTION OF THE PREFERRED EMBODIMENTS

The examples of the present invention will be described below with reference to the drawings.

In each example given below, there is provided a scanner as a peripheral device, and the start and control of an image read processing with the scanner will be explained as the example.

[First example]

In this example, a host computer issues a command inquiring a device type to each peripheral device connected thereto, knows a corresponding program by receiving and interpreting a response, and loads the program.

Figure 1:
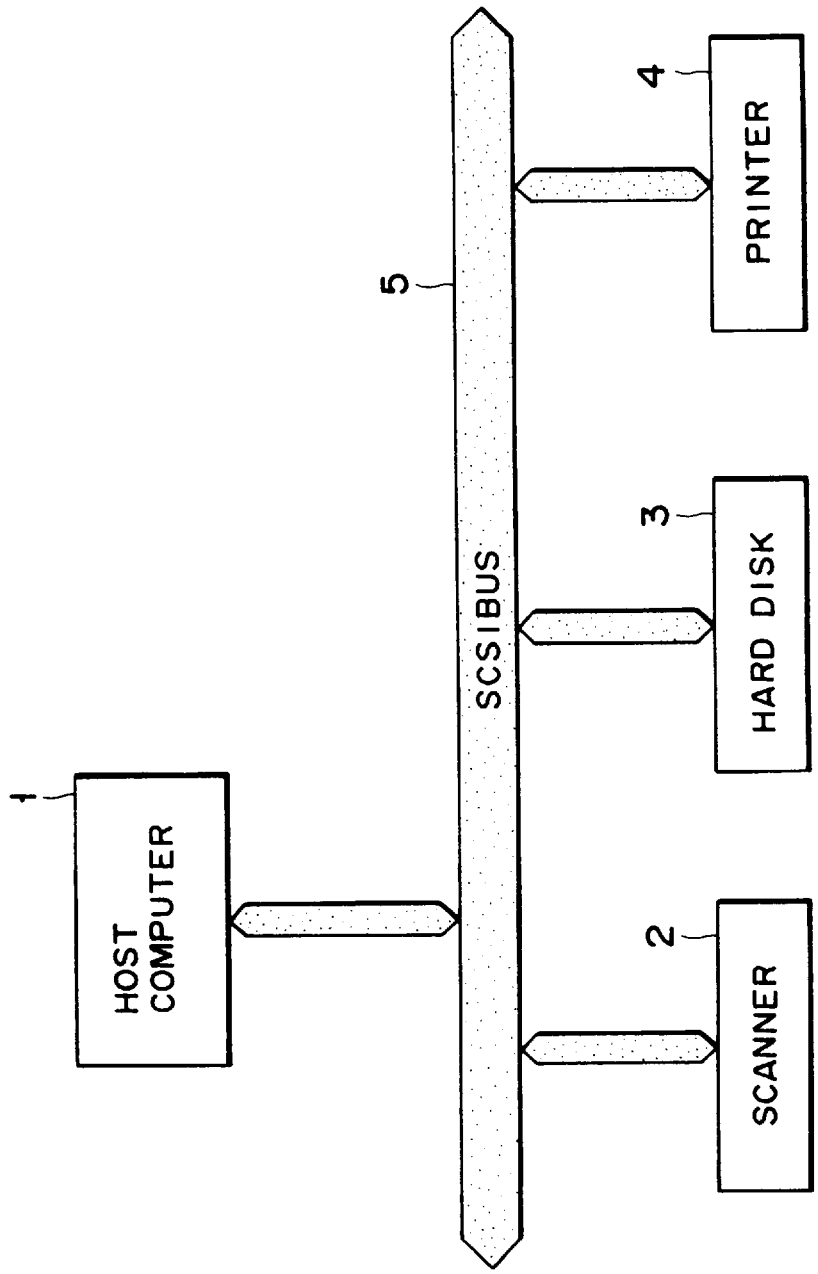
FIG. 1 is a block configuration diagram of an information processing system in one example.

FIG. 1 is a block diagram showing the configuration of an information processing unit in this example, which is common to the second and third examples.

In the same figure, 1 is the host computer for controlling various types of peripheral devices in accordance with control programs corresponding to those peripheral devices.

2 is an image read unit (scanner) for converting the document information of an original laid on an original board to an electric signal with a pickup element such as CCD, 3 is a hard disk which is an external memory for storing the system control program and image data. 4 is a high-speed printer such as a laser beam printer for recording an image onto a recording medium based on the information of the electric signal. 5 is an SCSI bus for electrical connection between the host computer 1, the scanner 2, the hard disk 3 and the printer 4.

SCSI (Small Computer System Interface) is an interface which ANSI (American National Standard Institute) has established as ANSI X3.131-1986.

One SCSI bus allows up to eight devices to be connected, with each connected device being given ID of 0 to 7.

An image processing operation will be described below.

Note that IDs of the host computer 1, the scanner 2, the hard disk 3 and the printer 4 are set as 0, 1, 2 and 3, respectively.

The host computer 1 first acquires a utilization right of the SCSI bus 5, and selects the scanner 2 of ID=1. Then, the host computer 1 transmits a READ command via the SCSI bus 5 to the scanner 2. The scanner 2 reads an original laid on the original board, and transfers its original image via the SCSI bus 5 to the host computer 1. The host computer 1 stores its original image in an internal memory. Similarly, to preserve the original image, the host computer 1 selects the hard disk 3 of ID=2, and transfers and writes the original image in an internal memory of the host computer 1 via the SCSI bus 5 to the hard disk 3.

Also, to print out the original image, the host computer 1 selects the printer 4 of ID=3, and transfers and prints out the original image in the internal memory of the host computer 1 via the SCSI bus 5 to the printer 4.

In the information processing system as configured above, the host computer 1 issues an inquiry information to each input/output device (scanner 2, hard disk 3 and printer 4 in this example), interprets an individual response information from each input/output device, identifies an input/output device connected to an input/output bus, selects an appropriate control software, based on that identified result, to read it from storage means to the host computer, so that the optimal system start environment can be set.

Also, in the image processing system as configured above, if each predetermined switch information necessary for the image processing on each input/output device is set, each predetermined information set on each input/output device is transferred via the input/output bus to the host computer 1 by means of a transfer feature (which is provided on the scanner 2, the hard disk 3 or the printer 4, but on the scanner 2 in this example), and the start of each input/output device is carried out by interpreting each predetermined switch information transferred thereto and based on each predetermined information set therein.

Figure 2:
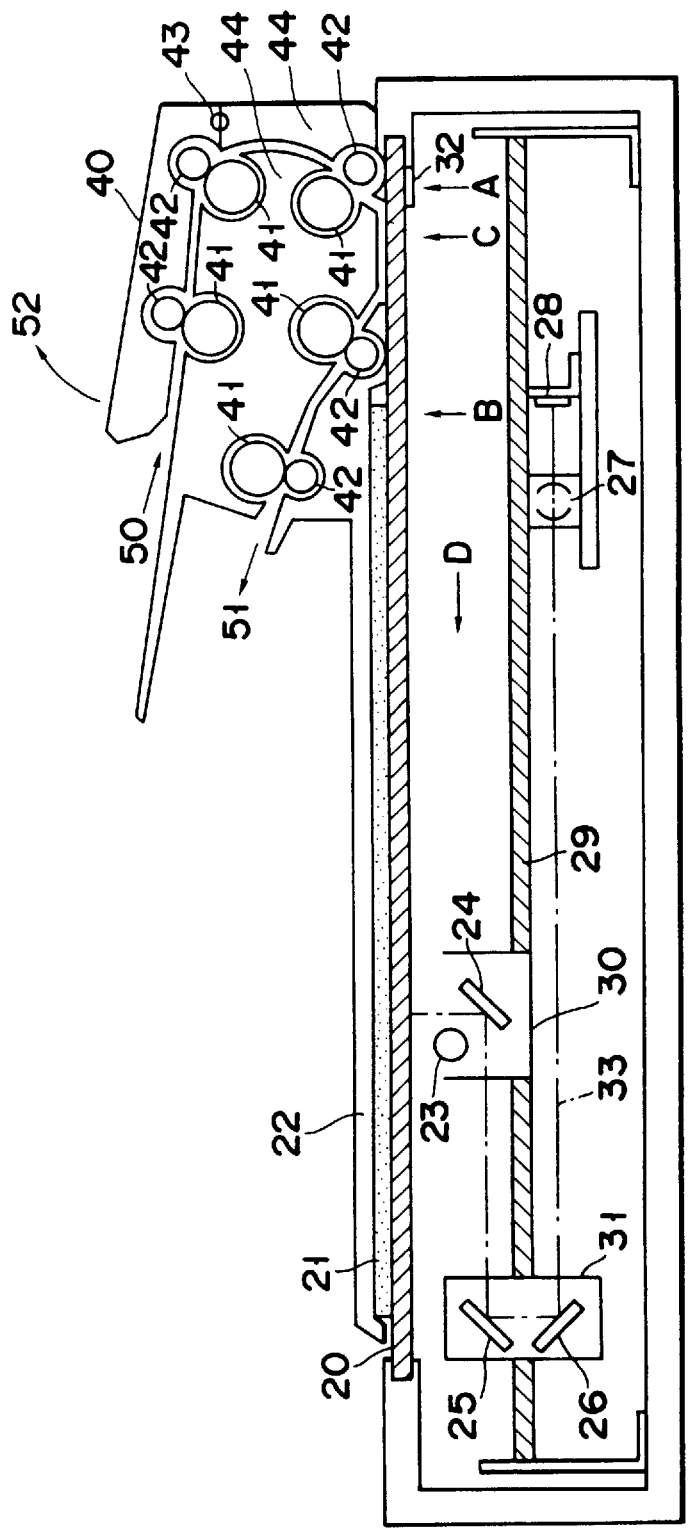
FIG. 2 is a cross-sectional view of a read scan unit of an image read device.

Referring now to FIG. 2, a specific transfer operation and a process execution processing operation in the scanner 2 and the host computer 1 will be described.

FIG. 2 is a detailed cross-sectional view for explaining a constitution of the scanner 2 as shown in FIG. 1, and the constitution and the operation will be described below.

An original is laid between a pressure plate 22 for automatic original feeder and original glass and an original board plate 20, with its upper surface down, and pressed against a glass surface of the original board glass plate 20 by a presser member 21 made up of a soft material. The original is illuminated by a fluorescent lamp 23, and an optical path 33 is formed so that its reflected light is concentrated via mirrors 24, 25, 26 and a lens 27 on a surface of an image sensor 28 having a plurality of light receiving elements arranged in a column. A sliding board 30 has the fluorescent lamp 23 and the mirror 24 mounted thereon, while a sliding board 31 has the mirrors 25 and 26 mounted thereon, performing the sub scan movement along a shaft 29.

The sliding boards 30 and 31 move at a relative speed 2:1 by applying PLL with a DC servo motor. In a flat bed scan, the sliding board 30 starts to read from a position indicated by the arrow B, moving in a direction as indicated by the arrow D, so that the original image on the original board glass 20 is focused onto a surface of the image sensor 28.

The image sensor 28 outputs a digital image signal of 8 bits indicating the density of image sequentially read for each line.

The automatic original feeder 22 feeds an original from the arrow 50 toward the arrow 51 by means of an original guide member 44, an automatic original feeder cover 40, five original feeding rollers 41 and driven rollers 42 opposed thereto. When the automatic original feeder 22 is used, a reading position of the sliding board 30 is one as indicated by the arrow C. If a leading end of the original inserted from a direction of the arrow 50 reaches the reading position C, reading of the original is started, and after termination of the reading, the original is exhausted in a direction as indicated by the arrow 51.

The automatic original feeder cover 40 can be opened around a fulcrum 43 in a direction as indicated by the arrow 52, when the original is jammed within the automatic original feeder 22, thereby permitting the original to be removed.

34 is a switch panel on which a read start instruction switch and a density setting switch are disposed.

Figure 3:
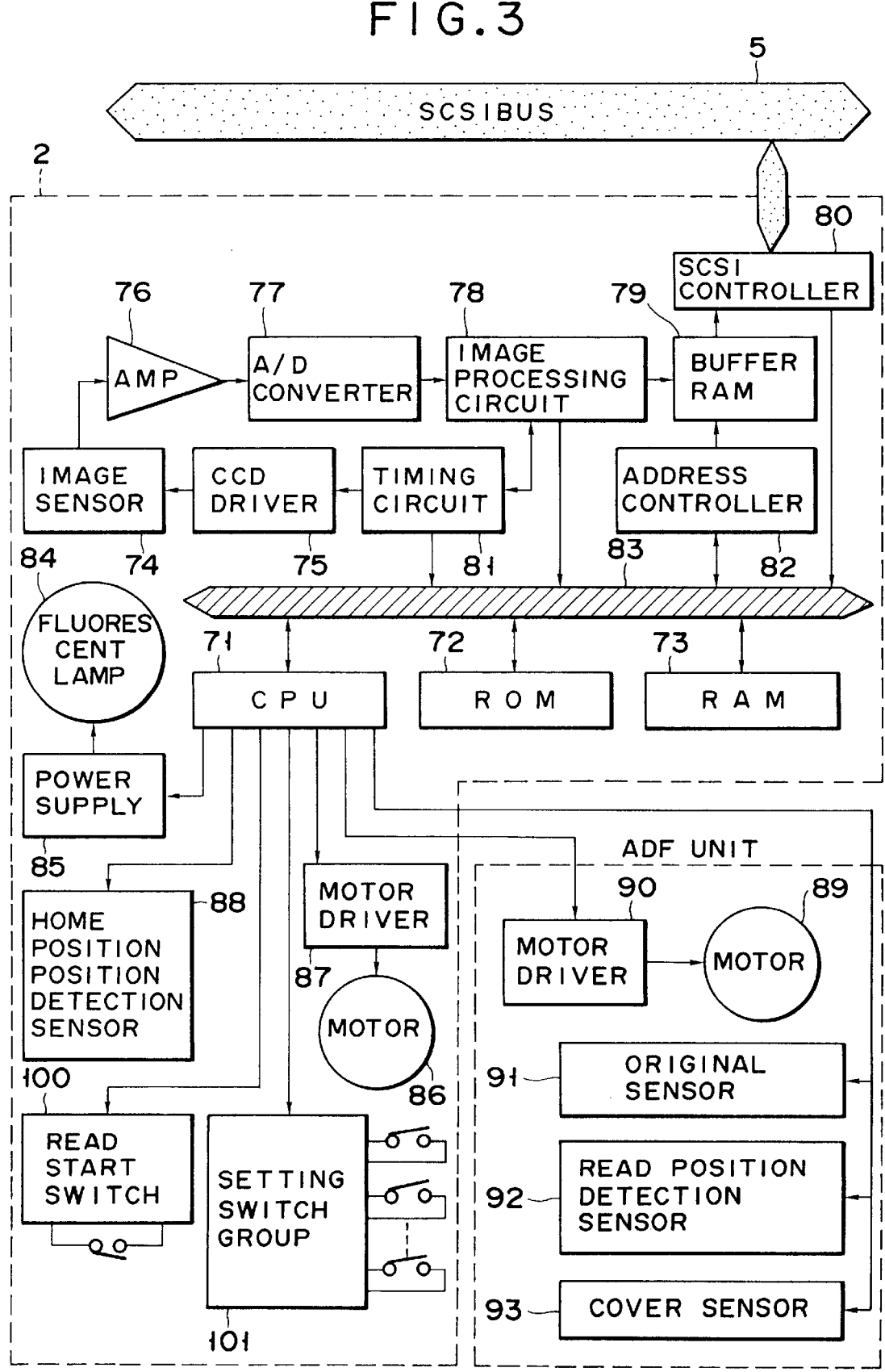
FIG. 3 is a block configuration diagram of the image read device.

FIG. 3 is a block diagram for explaining a circuit configuration of the scanner 2 as indicated in FIG. 1.

In the figure, 71 is a central processing unit (CPU) composed of a microcomputer. 72 is a scanner program ROM (read only memory) in which a scanner control program is prewritten, allowing the CPU 71 to control the scanner 2 with the program in the ROM 72. 73 is a RAM (random access memory) useful as a working memory for the CPU 71. 74 is an image sensor made up of CCD, having a plurality of light receiving elements arranged in a column, for converting the document information of original into an electric signal. 75 is a CCD driver circuit for driving the image sensor 74. 76 is an amplifier for amplifying the electric signal output from the image sensor 74. 77 is an A/D converter for converting an analog signal output from the amplifier 76 to a digital signal.

78 is an image processing circuit for making a shading correction, enlargement, reduction, negative-positive inversion, and clipping for the digital image signal output from the A/D converter 77.

79 is a buffer RAM which is an image memory as large as a plurality of lines for storing the image signal output from the image processing circuit 78 in a unit of one main scan line. 80 is a SCSI controller for performing the SCSI communication such as the transmission of image signal, command reception, status transmission via the SCSI bus 5 to the host computer 1. 81 is a timing circuit for generating a timing signal for the CCD driver circuit 75 and the image processing circuit 78. 82 is an address controller for generating an address in writing an image signal output from the image processing circuit 78 into the buffer RAM 79, or an address in reading the image signal from the buffer RAM 79 to the SCSI controller 80. 83 is a CPU bus for electrically connecting the CPU 71, the scanner program ROM 72, the RAM 73, the image processing circuit 78, the timing circuit 81, and the address controller 82. 84 is a fluorescent lamp for illuminating the original. 85 is a power source for lighting up the fluorescent lamp 84 as above described, in which the lighting or extincting of the fluorescent lamp 84 is made with an instruction of the CPU 71. 86 is a motor for moving the sliding boards 30, 31 as shown in FIG. 2 in the sub scan direction. 87 is a motor driver for driving the motor 86. 88 is a home position detection sensor for detecting a read start position of the sliding board 30 as shown in FIG. 2.

89 is a motor for rotating the original feed roller 41 of the automatic original feeder 22 as shown in FIG. 2.

90 is a motor driver for driving the motor 89.

91 is an original sensor for detecting the original. 92 is a read position detection sensor for detecting a leading end of the original. 93 is a cover sensor for detecting an open/close state of the automatic original feeder cover 40.

100 is a switch for inputting a read start instruction, and 101 is a setting switch group for setting the read density.

Figure 4:
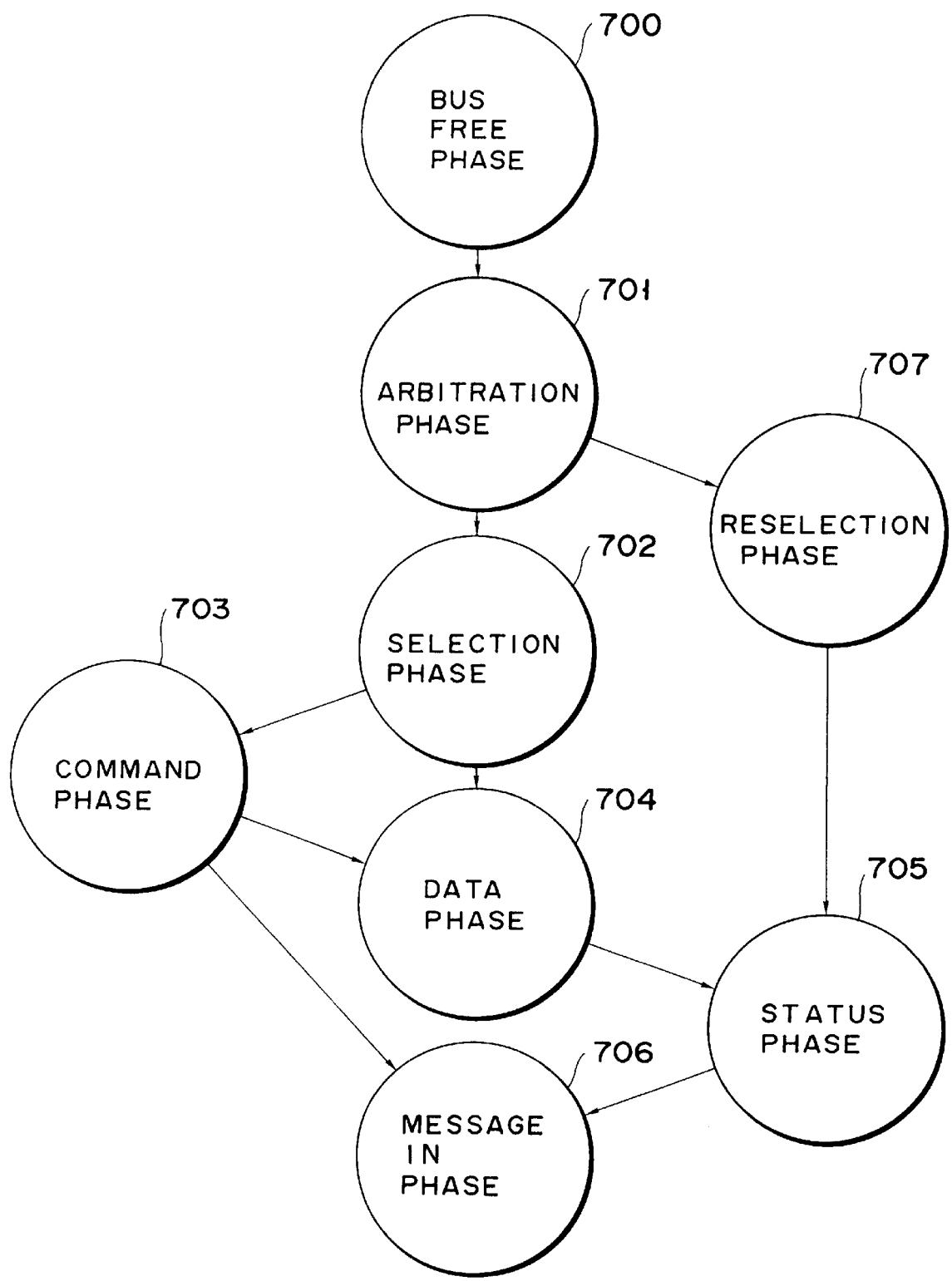
FIG. 4 is a diagram showing the transitions of phase in a SCSI bus.

Referring now to FIG. 4, the phase processing operation of the SCSI bus 5 as shown in FIG. 1 will be described.

Each device connected to the SCSI bus 5 controls the bus phase as shown in FIG. 4 in a sequence of the arrow for the command processing.

700 is a bus free phase which is a state where each device does not use the SCSI bus 5.

701 is an arbitration phase which is a phase where a device connected to the SCSI bus 5 acquires a utilization right of the bus.

702 is a selection phase which is a phase where the device (initiator) having acquired the utilization right of the SCSI bus 5 in the arbitration phase 701 selects another device (target) and connects it logically.

In this example, in reading an image, the host computer 1 becomes an initiator and the scanner 2 becomes a target, while in transferring the image read start information or the read density information, the scanner 2 becomes the initiator and the host computer 1 becomes the target.

703 is a command phase which is a phase where the target receives a series of commands from the initiator.

704 is a data phase which is a phase for transmitting and receiving data between the initiator and the target.

705 is a status phase which is a phase where the target transfers an executed result of command to the initiator. When the command is normally terminated, a GOOD status (00) is transferred, while when the command is terminated abnormally, a Check Condition status (02) is transferred.

706 is a message in phase which is a phase where the target transfers a message to the initiator. If the execution of the command is terminated, a command complete message (00) is transferred.

Figure 5:
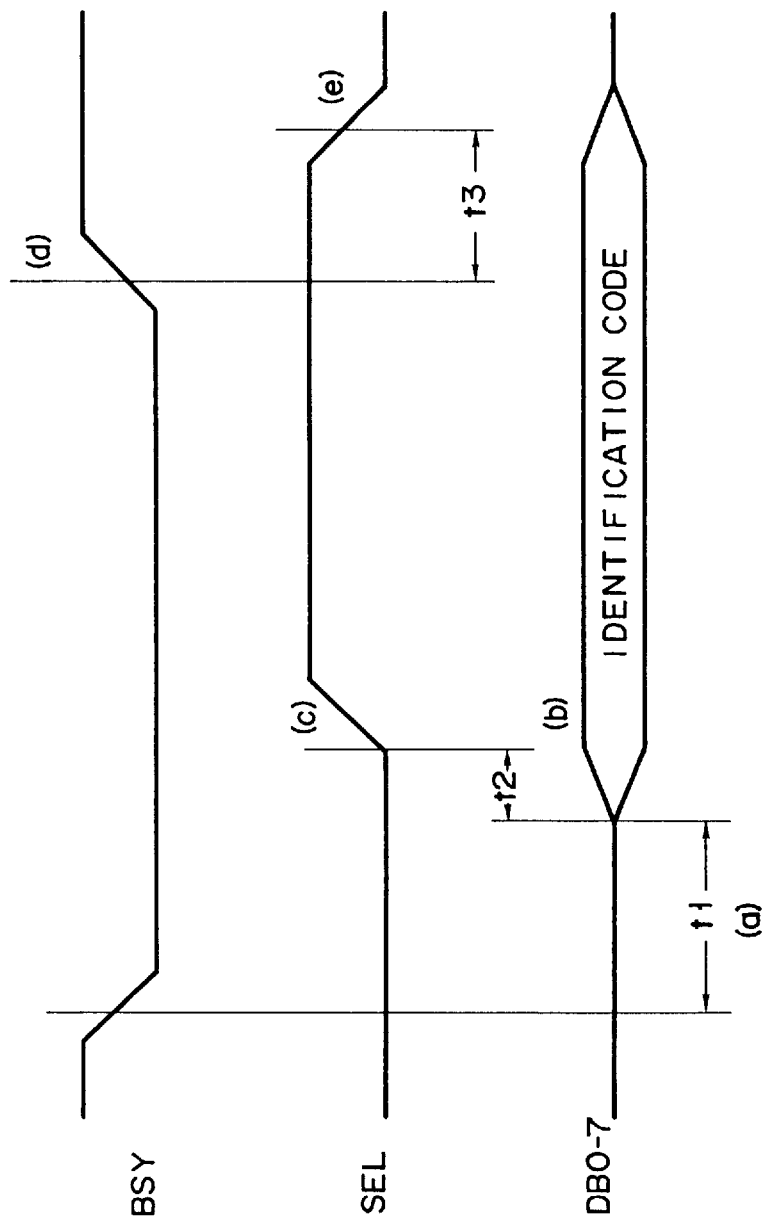
FIG. 5 is a timing chart showing a selection processing operation.

707 is a reselection phase which is a phase where the target transferring a disconnect message in the message in phase 706 and opening the bus temporarily selects the initiator and reconnects it logically., Referring now to a timing chart as shown in FIG. 5, the SCSI bus selection processing operation will be described.

FIG. 5 is the timing chart for explaining the selection processing operation in the selection phase 702 as shown in FIG. 4. Note that the selection of device is performed by a signal BSY, a signal SEL, and signals DB0 to DB7.

Firstly, a device (initiator) acquiring the utilization right of the SCSI bus 94 waits for the passage of time t1 (timing (a)).

Subsequently, the initiator outputs an identification code of 0 to 7 corresponding to the device to be selected to the signals DB0 to DB7 (timing (b)).

Next, the initiator sets a (timing (c)) signal SEL when the time t2 has passed by.

And the device (target) to be selected responds by setting the signal BSY (timing (d)), if the signal SEL is set and its own identification code is detected in the signals DB0 to DB7.

Subsequently, the initiator resets the signal SEL after the time t3 has passed from the detection of the signal BSY of target (timing (e)).

With the above sequence, the selection of device is terminated. Unless the target may respond to the selection of the initiator within 250 msec, with the signal BSY, the selection becomes false.

Figure 6:
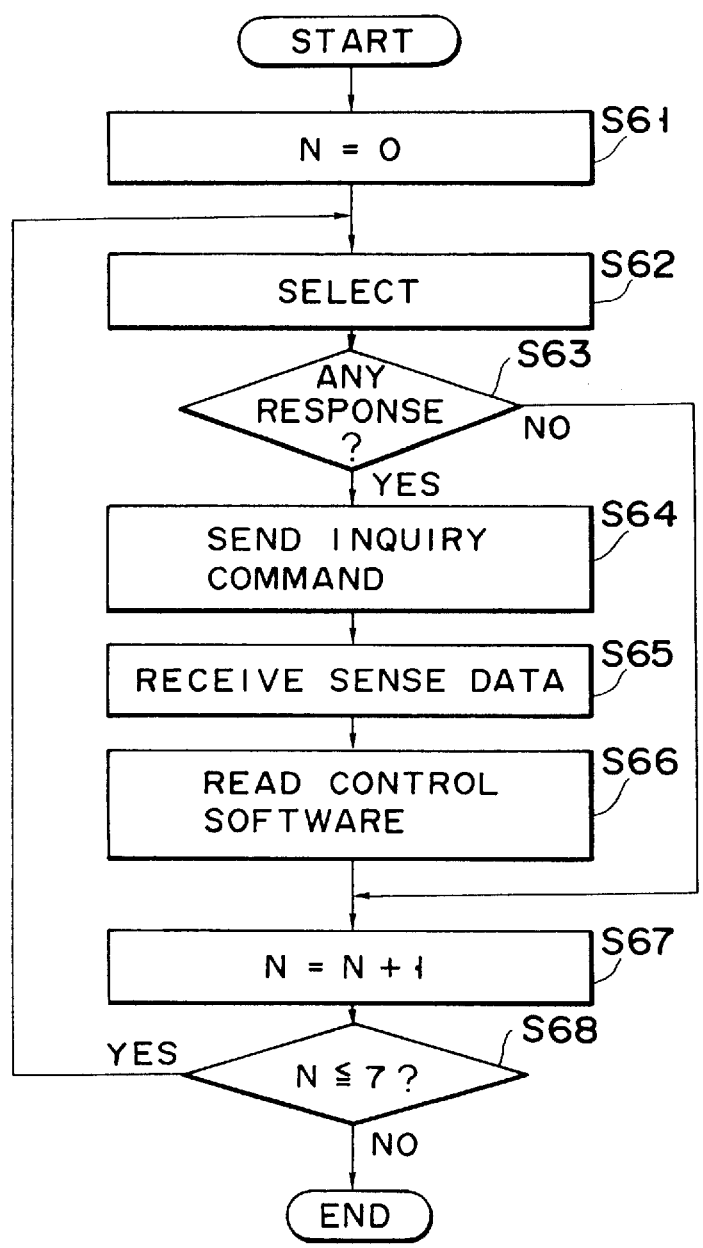
FIG. 6 is a flowchart showing a procedure of control software read operation.

Referring now to a flowchart as shown in FIG. 6, the peripheral device control program selection processing will be described.

FIG. 6 is the flowchart showing one example of each control program selection process procedure for an input/output device connectable to the SCSI bus 5 as shown in FIG. 1.

Firstly, at step S61, the host computer 1 prepares an identification code variable N in a work RAM internally provided and sets 0.

Next, at step S62, the host computer 1 selects a device as shown with the identification code storage variable N in the previous sequence. At step S63, the host computer 1 waits for a responce from the selected device for 250 msec at maximum, and if NO, the routine proceeds to step S67 and the followings, by considering that there is no input/output device corresponding to this identification code, while if YES, the host computer 1 transmits the INQUIRY command as described thereafter to the selected device at step S64. Next, at step S65, the host computer 1 receives a sense data which is a response from the input/output device, interpreting the sense data returned, and judging that the device is a scanner 3, for example.

At step S66, the host computer 1 reads the control program of the scanner 3 from the hard disk 2 into a main memory, because the input/output device connected thereto was judged as the scanner 3 at step S65.

Subsequently, at step S67, 1 is added to the identification code storage variable N. And at step S68, the host computer 1 judges whether or not the identification code storage variable N is less than 7, and if YES, the routine returns to step S62 to continue the automatic selection processing, while if NO, that is, all control softwares for the input/output device have been read into the main memory, the processing is terminated.

FIG. 7 is a table for explaining a format of the INQUIRY command in the image processing system according to the present invention.

As will be seen from this table, the INQUIRY command is constituted of 6 bytes from byte 0 to byte 5, with 12h (hexadecimal) indicating the INQUIRY command being set in the byte 0. Also, in the byte 4, the Allocation length (36) is set, indicating the length of sense data returned from other input/output device.

FIG. 8 is a table showing a format of sense data returned from an input/output device connected to the SCSI bus 5 as shown in FIG. 1. Note that the formats of the INQUIRY command and the sense data are common to each input/output device.

As will be seen from this table, BIT0 to BIT4 in the byte 0 can be used to specify a device type of the device, with the Peripheral Device Type. The bytes 8 to 15 are a Vendor Identification field for setting a maker name, and the byte 16 to 31 are a Product Identification field for setting a product name. And the bytes 32 to 35 are a Product Revision field for showing a revision number. This allows the host computer 1 to select not only the device type but also more minutely, a control software, such as a scanner control software with the product name a, ver. 1.01 made by A company, and a scanner control softwre with the product name b, ver. 3.01 made by B company. Note that this example corresponds to an instance of setting with the ASCII string.

FIG. 9 is a table showing the detail of peripheral device type as shown in FIG. 8.

As will be seen from this table, for the scanner 3, for example, 06 is entered. The host computer 1 can select an appropriate control software by judging the input/output device with the Peripheral Device Type.

As described above, according to this invention, the host computer is configured to issue an inquiry information to each input/output device, interpreting an individual response information from each input/output device, identifying an input/output device to be connected to the input/output bus, and reading an appropriate control software into the host computer, based on an identified result, so that a conventional complicated instruction operation, in which the operator judges and selects the appropriate control software in accordance with various input/output devices connectable to the bus, can be avoided, and an optimal control software necessary for an information processing system constructed is automatically loaded simply by connecting a desired input/output device to the bus, whereby the excellent effects capable of setting the system start environment can be achieved.

[Second example]

In the following, an example of transferring the setting values with the switch on a peripheral device side to a host computer side will be described.

Figure 10:
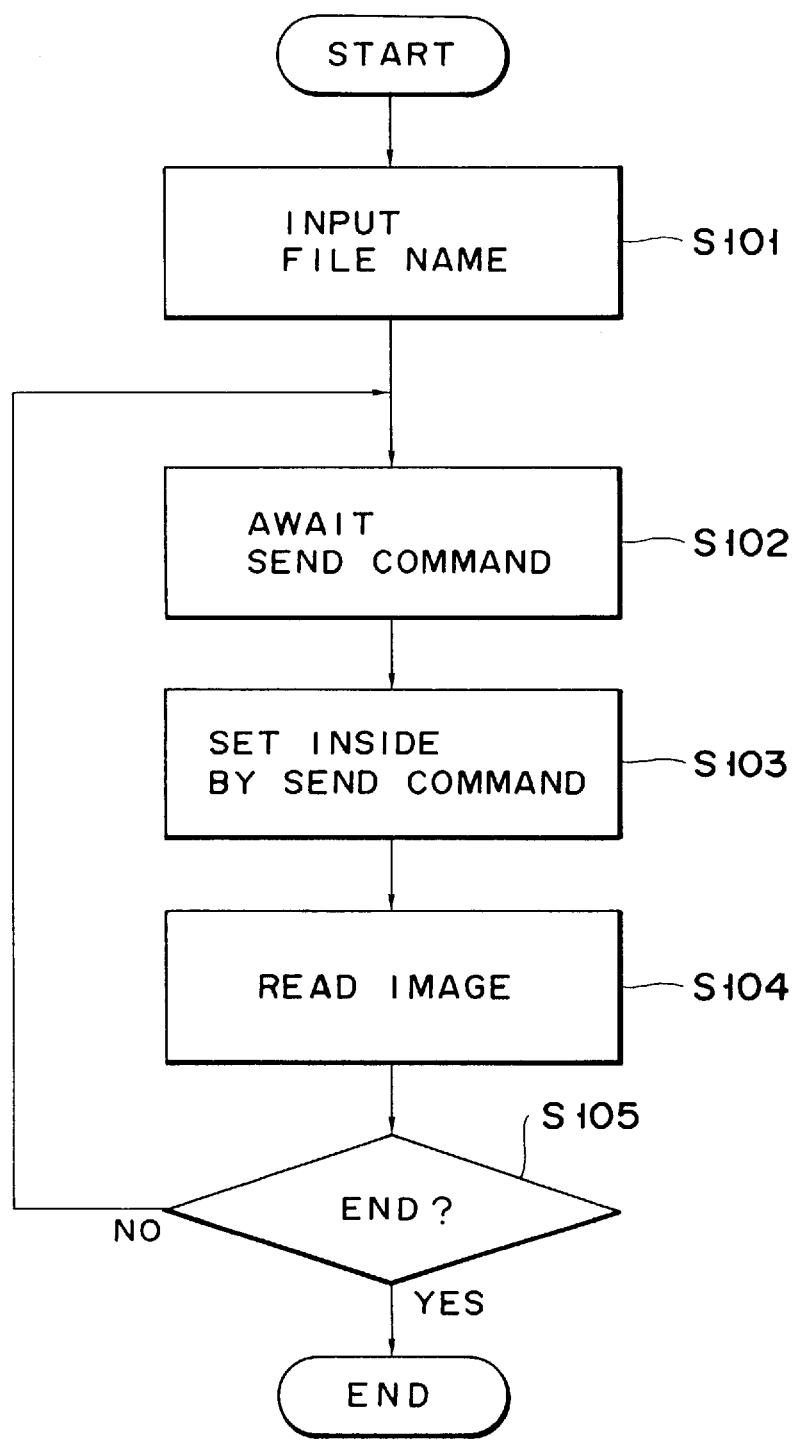
FIG. 10 is a flowchart showing a processing procedure of a host computer in an image reading process.

In this example, the peripheral device is a scanner 2 as described in FIGS. 2 and 3, and referring to a flowchart as shown in FIG. 10, the operation of reading a plurality of originals with the scanner 2 will be described as the example.

FIG. 10 is the flowchart showing a processing procedure of the host computer in the above operation. Firstly, at step S101, the operator inputs a file name or the number of originals useful in storing an image read from the scanner 2 into a hard disk 3 to the host computer 1.

Proceeding to step S102, the host computer 1 waits for the SEND command to be entered from the scanner 2. Here, the operator lays a first original on an original board of the scanner 2, making the settings such as read density, read resolution, read magnification, and read size with the switch on a panel of the scanner 2. If a read start switch 100 is depressed, the scanner 2 transfers the density, read magnification, read size set on the panel of the scanner 2 to the host computer 1, using the SEND command in the format as shown in FIGS. 12A and 12B. Afterwards, the scanner 2 waits for the READ command to be sent out from the host computer 1.

Next, at step S103, the host computer 1 interprets the SEND command sent from the scanner 2, and sets inside the read density, read resolution, read magnification and read size.

At step S104, the host computer 1 issues the READ command to the scanner 2 to instruct the start of original image read processing.

If receiving the READ command, the scanner 2 moves the sliding board 30 as shown in FIG. 2 to a position of the arrow A, and lights up the fluorescent lamp 23 to make the correction for light quantity. Next, it moves the sliding board 30 to a position of the arrow B. And the scanner 2 reads an original for each one line, and transfers it to the host computer 1.

Then, at step S105, the host computer 1 judges whether or not all originals have been read, and if NO, the routine returns to step S102, to repeat the original read processing, and if YES, the processing is terminated.

Figure 11:
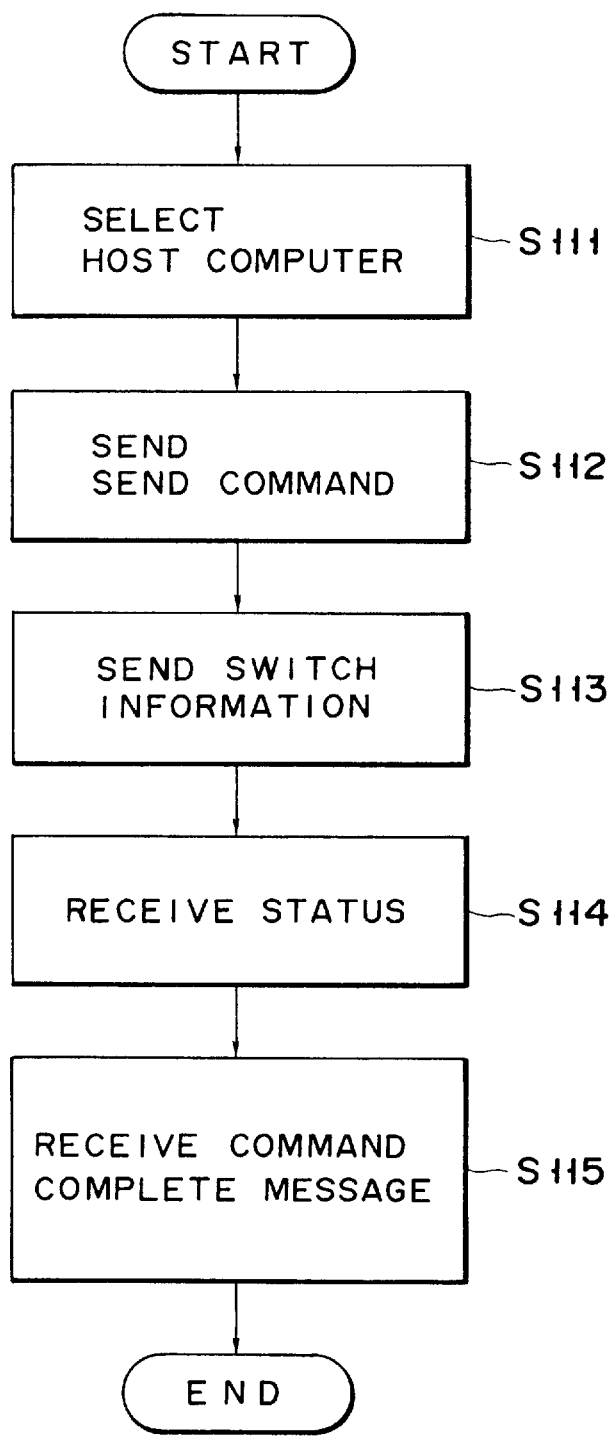
FIG. 11 is a flowchart showing a procedure for transferring the setting information on a peripheral device to the host computer.

Referring now to FIG. 11, a processing operation will be described in which the scanner 2 transfers the switch information such as read density, read resolution, read magnification, read size and read start information to the host computer 1.

FIG. 11 is a flowchart showing one example of the switch information transfer procedure of the scanner 2 as shown in FIG. 1 to the host computer 1.

Firstly, at step S111, if the scanner 2 confirms that the SCSI bus 5 is in the bus free phase 700, the scanner 2 acquires the bus right by placing it in the arbitration phase 701. Next, the scanner 2 places the SCSI bus 5 in the selection phase 702, and selects the host computer 1. Thus, the host computer 1 and the scanner 2 are logically connected.

At step S112, in the subsequent command phase 703, the scanner 2 sends the SEND command as described thereafter having the Transfer Data Type of 80H (hexadecimal).

On the other hand, if receiving the SEND command, the host computer 1 examines the Transfer Data Type of the SEND command, and judges it as the transfer of switch information when the value is 80H.

At step S113, in the data phase 704, the switch information having the format as shown in FIGS. 12A and 12B are sent from the scanner 2 to the host computer 1. The host computer 1 interprets the switch information, and stores the read density, read resolution, read magnification, read size and read start information in an internal work memory.

If the scanner has transferred all the switch information to the host computer 1 the host computer 1 places the SCSI bus in the status phase 705, and sends the Good status (00H) indicating that the SEND command is normally terminated to the scanner 2. At step S114, the scanner 2 receives the Good status (00H) and knows that the SEND command is normally terminated.

Next, placing the SCSI bus 5 in the message in phase 706, the host computer 1 sends the command complete message (00H) indicating that the SEND command is all terminated to the scanner 2. At step S115, the scanner 2 receives the command complete message (00H) and knows that the SEND command has been terminated. It places the SCSI bus 5 in the bus free phase 700 and terminates the SEND command.

FIGS. 12A and 12B are tables showing one example of the format for the SEND command in the image procesing system as shown in FIG. 1.

FIG. 12A shows the CDB (Command Descriptor Block) in the SEND command, constituted of byte 0 to byte 9, in which the byte 0 is an Operation Code, containing 2AH (hexadecimal) indicating the SEND command.

The byte 2 is the Transfer Data Type in which 80H is set in transferring the switch information.

The byte 6 to byte 8 are the Transfer Length in which the parameter block transfer number 13 is set.

FIG. 12B shows a parameter block in the SEND command, constituted of byte 0 to byte 12, the byte 0 of the parameter block containing the operation instruction which indicates that the read operation is started by the operator's depressing of a read start switch, when it is 1.

The byte 1 contains a value in a range from 1 to 255 to show the read density, indicating the highest density at 1 and the lowest density at 255, with the center at 128.

The bytes 2 to 3 contain a value in a range from 75 to 300 to show the resolution, which is set such as 75 for 75 DPI (Dot Per Inch), or 300 for 300 DPI.

The bytes 5 to 8 contain a value showing the main scan width for reading in a unit of byte.

The bytes 9 to 12 contain a value showing the sub scan length for reading in a unit of line.

While in the above example, the panel switch information of the scanner is transferred via the SCSI bus 5, except for the file name and the number of read originals, it is also possible to make the partial setting on the host computer 1, or set the number of read originals with the panel switch of the scanner 2.

As above described, according to this invention, the setting values such as switches on each input/output device are transferred via the input/output bus to the host computer, which controls each input/output device of transfer origin by analyzing those transferred setting values, so that if various predefined settings such as switches changeable by each input/output device are made, the setting contents are transferred to the host computer, which then starts the processing. Accordingly, after the initial settings necessary on the host computer are made, each processing can be executed only by setting the switch information necessary on each input/output device, thereby taking effect in reducing greatly the burden of the operator on the system operation, as compared with the instructing operation based on a conventional host computer.

[Third example]

In the host computer, the capacity necessary for storing programs is increased with the increase of corresponding device products, but some programs may be rarely used, which decreases the utilization efficiency of memory.

Also, when a new program was needed for a new product, it was necessary to add this program to the memory.

In this example, an example in which the control program for the host computer to control a peripheral device is provided on the peripheral device side will be described.

Figure 13:
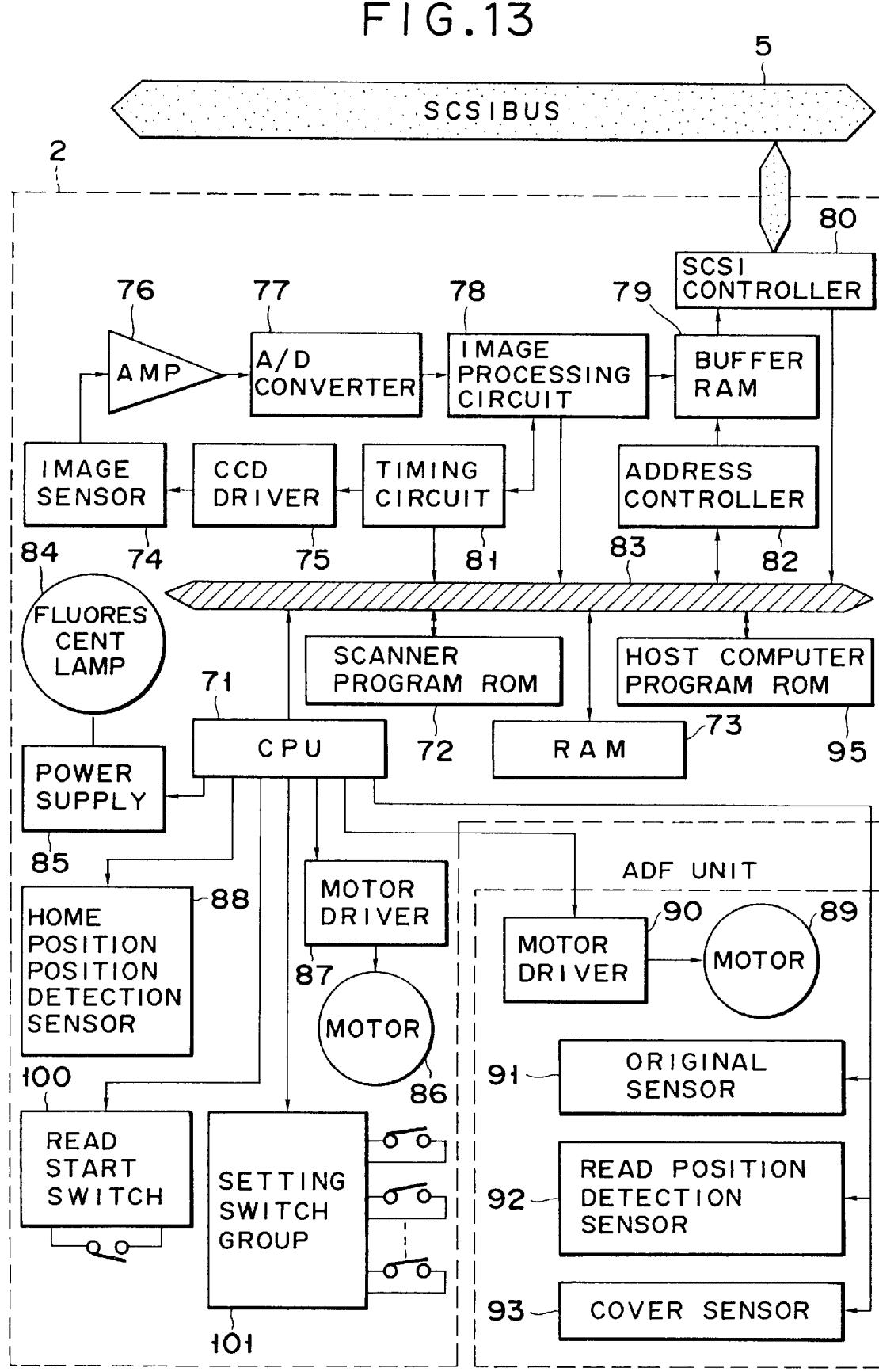
FIG. 13 is a block configuration diagram of an image read device in a third example.

FIG. 13 is a block diagram showing a circuit configuration of a scanner 2 as the peripheral device in this example.

The configuration of the same figure is different from that of FIG. 3 only in that FIG. 13 has a host computer program ROM 95, but other portions are the same and the explanation will be omitted.

95 is the host computer program ROM in which a program for the host computer to control the scanner 2 is prewritten, and this program can be output to the SCSI bus 5 via the CPU bus 83 and the SCSI controller 80.

Figure 14:
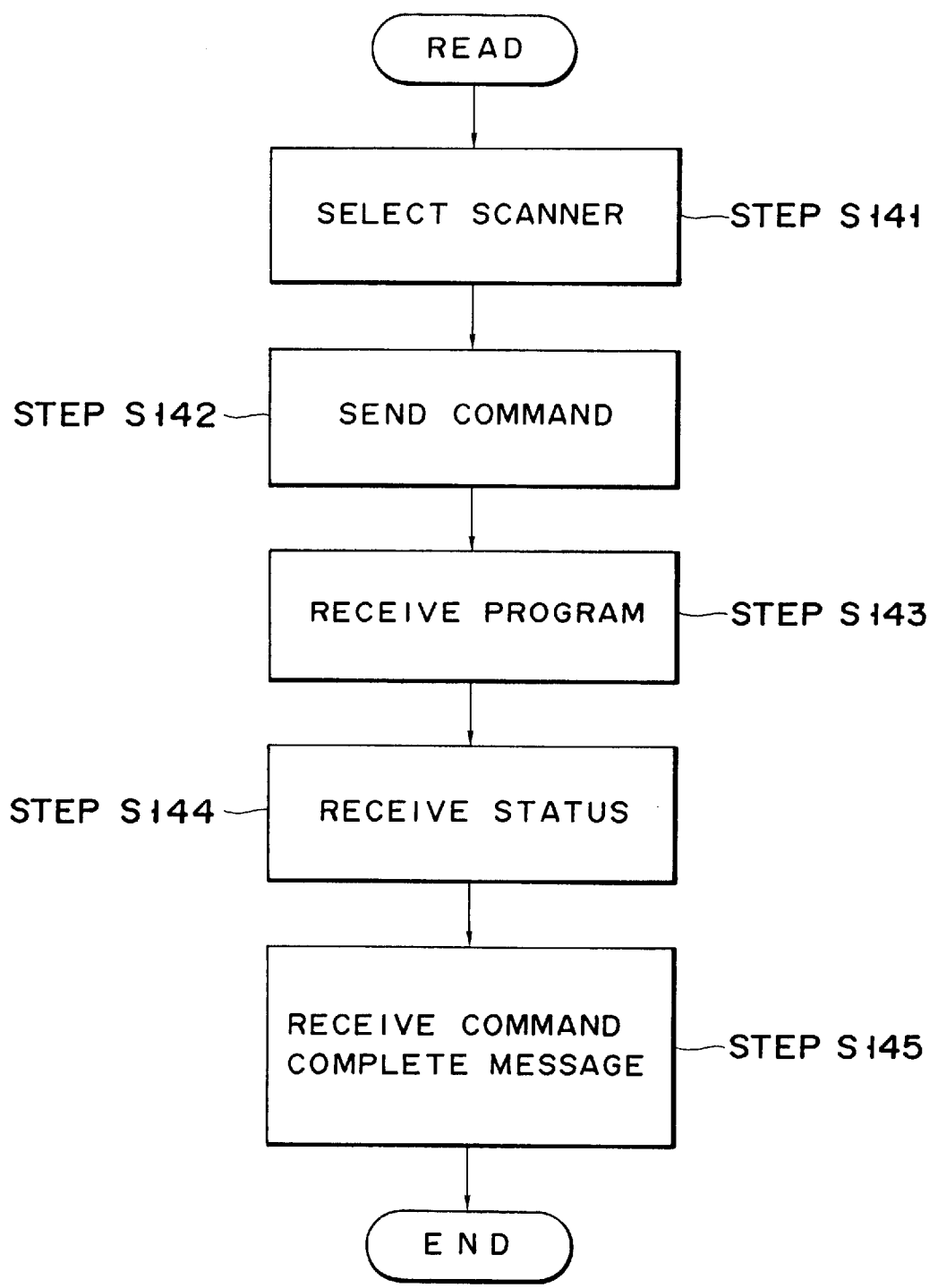
FIG. 14 is a flowchart showing a procedure of a control program read processing in the third exmaple.

Next, the operation for the host computer 1 to read a host computer control program from the ROM 95 of the scanner 2 will be described with reference to a flowchart on the host computer side as shown in FIG. 14.

Firstly, at step S141, if the host computer confirms that the SCSI bus 5 is in the bus free phase, the host computer acquires the bus utilization right by placing it in the arbitration phase 701. Next, the host computer places the SCSI but 5 in the selection phase 702, and selects the scanner 2. Thus, the host computer 1 and the scanner 2 are logically connected.

At step S142, the host computer 1 places the SCSI bus 5 in the command phase 703, and sends the READ command as described thereinafter with the Transfer Data Type being 80H (hexadecimal).

On the other hand, if receiving the READ command the CPU 71 of the scanner 2 examines the Transfer Data Type of the READ command, and, judges it as the transfer of program when the value is 80H.

At step S143, placing the SCSI bus 5 in the data phase 704, the host computer 1 receives a program from the scanner 2. The CPU 71 of the scanner 2 reads the program written therein one byte after another from the host computer program ROM 95, and writes it via the CPU bus 83 to the SCSI controller 80. The SCSI controller 80 transfers this read program via the SCSI bus 94 to the host computer 1. This operation is repeated until all programs written in the host computer program ROM 95 have been transferred.

At step S144, if the scanner 2 has transferred all the programs written in the host computer program ROM 95, the host computer 1 places the SCSI bus in the status phase 705, and sends the Good status (00H) indicating that the SEND command is normally terminated to the host computer. The host computer receives the Good status (00H) and knows that the READ command is normally terminated.

At step S145, placing the SCSI bus 5 in the message in phase 706, the scanner sends the command complete message (00H) indicating that the READ command is all terminated to the host computer 1. The host computer 1 receives the command complete message (00H) and knows that the READ command processing has been all terminated. And it places the SCSI bus 5 in the bus free phase 700 and terminates the READ command.

FIG. 15 shows a format example of the READ command in this example. The READ command is composed of a CDB (Command Descriptor Block) of 10 bytes, from byte 0 to byte 9. The byte 0 is an Operation Code, containing 28H (hexadecimal) indicating the READ command. The byte 2 is the Transfer Data Type in which 00H is set in reading an image data, and 80H is set in reading the host computer program. The byte 6 to byte 8 are the Transfer Length in which the transfer byte number is set.

The host computer 1 writes programs read from the scanner 2 into a memory within a main body, as above described, reads and executes them as necessary.

As above described, according to the present invention, the host computer control program for the host computer to operate a peripheral device is stored in the peripheral device, and this control program is read via the input/output bus to the host computer, with an instruction of the host computer, and then executed, so that (1) it is unnecessary to store a large number of control programs to cope with a variety of device products connectable to the external storage such as a floppy disk unit or hard disk unit, or the internal storage such as ROM, and (2) as the control program is placed within the peripheral device, the operation is made easier in moving and installing the peripheral device, or connecting it to another host computer.

What is claimed is:

1. A system including a host computer connected to a bus and a peripheral device connected thereto, wherein said bus is connectable to a plurality of types of peripheral devices, each of a plurality of peripheral devices connected to said bus comprising:

program memory means for storing a control program for controlling the peripheral device by the host computer in advance;

acceptance means for accepting a request command for requesting transfer of the control program from the host computer; and transfer means for transferring the control program to said host computer in response to the request command accepted by said acceptance means, and said host computer comprising:

selection means for selecting each of said plurality of peripheral devices connected to said bus, one by one;

transmission means for transmitting the request command to the peripheral device selected by said selecting means;

receiving means for receiving the control program transferred from said selected peripheral device in response to the request command;

internal memory means for storing said control program received by said receiving means; and control means for controlling said selected peripheral device with said control program stored in the internal memory means.

2. The system according to claim 1, wherein said peripheral device further comprises:

operation means for generating a plurality of settings;

reading means for reading operation results by said operation means; and determining means for determining control parameters on the basis of the operation results read by said reading means, said peripheral device transferring the control parameters determined by said determining means by said transfer means in response to a request command for requesting transfer of said control parameters.

3. A method of loading a program on a host computer connected to a bus, from an external memory connected thereto, said external memory storing a plurality of control programs each corresponding to a plurality of types of peripheral devices connectable to the bus, respectively, said method comprising the steps of:

issuing an identification number on the bus for checking whether the identification number is assigned to any of a plurality of peripheral devices connected to the bus;

selecting a peripheral device in which the identification number is assigned, if a first response to the issue of the identification number is received within a predetermined interval;

transmitting an inquiry command to the selected peripheral device for inquiring of the selected peripheral device about a device type thereof;

receiving a second response representing the device type to said inquiry command from said selected peripheral device;

determining the device type of said selected peripheral device on the basis of the second response;

loading one of said plurality of control programs corresponding to the determined device type of said selected peripheral device on said host computer from said external memory;

incrementing the identification number if the loading is completed or the first response in not received within the predetermined interval; and repeating the preceding steps with the incremented identification number until the incremented identification number exceeds a predetermined number.

4. The method of loading a program according to claim 1, wherein said host computer and said peripheral devices are connected via an SCSI bus, and said inquiry command is sequentially performed for all the ID numbers available in the SCSI bus except for the host itself.

5. A method of controlling a peripheral device connected to a bus by a host computer connected thereto, wherein said host computer is connectable to a plurality of types of peripheral devices, comprising the steps of:

providing each of a plurality of peripheral devices connected to said bus with a program memory storing a control program for controlling a respective peripheral device by the host computer in advance;

selecting each of a plurality of peripheral devices connected to said bus, one by one;

transmitting a request command from said host computer to the selected one of the peripheral devices for requesting transfer of the control program for controlling said selected peripheral device;

transferring the control program from said selected peripheral device to said host computer in response to said request command;

storing said control program transferred from said selected peripheral device in an internal memory in said host computer;

controlling said selected peripheral device by said host computer with said control program stored in said internal memory;

operating an operation unit on said peripheral device;

determining control parameters by reading operation results on said operation unit by said peripheral device;

transmitting a second request command from said host computer to said peripheral device for requesting transfer of the control parameters;

transferring said control parameters determined by said determining step from said peripheral device to said host computer in response to said second request command;

storing said control parameters transferred from said peripheral device in said internal memory in said host computer; and controlling said peripheral device by said host computer with said control program and said control parameters stored in said internal memory.

6. A host computer connected to an external memory via a bus, said external memory storing a plurality of control programs each corresponding to a plurality of types of peripheral devices connectable to said bus, respectively, said host computer comprising:

issuing means for issuing an identification number on the bus for checking whether the identification number is assigned to any of a plurality of peripheral devices connected to the bus;

receiving means for receiving a response from one of said plurality of peripheral devices;

selecting means for selecting a peripheral device to which the identification number is assigned, if a first response to the issue of the identification number is received by said receiving means within a predetermined interval;

transmission means for transmitting an inquiry command to the peripheral device selected by said selecting means for inquiring of the selected peripheral device about a device type thereof;

judging means for judging the device type of said selected peripheral device on the basis of a second response representing the device type to the inquiry command,, received by said receiving means;

loading means for loading one of said plurality of control programs corresponding to the device type of said selected peripheral device on said host computer from said external memory;

increment means for incrementing the identification number if the loading by said loading means is completed or the first response is not received within the predetermined interval; and control means for controlling said issuing means to issue the incremented identification number unless the incremented identification number exceeds a predetermined number.

* * * * *

UNITED STATES PATENT AND TRADEMARK OFFICE
CERTIFICATE OF CORRECTION

PATENT NO. : 5,850,573

DATED : December 15, 1998

INVENTOR(S) : YOSHIHIRO WADA

It is certified that error appears in the above-identified patent and that said Letters Patent is hereby corrected as shown below:

In the drawings:

SHEET 7

Figure 8, "PROUCT" should read --PRODUCT--.

SHEET 11

Figure 12A, "TPANSFER" should read --TRANSFER--.

COLUMN 1

Line 48, "needs" should read --need--.

COLUMN 6

Line 42, "responce" should read --response--.

COLUMN 7

Line 15, "byte 16" should read --bytes 16--.
   Line 22, "softwre" should read --software--.

UNITED STATES PATENT AND TRADEMARK OFFICE
CERTIFICATE OF CORRECTION

PATENT NO.   :  5,850,573

DATED        :  December 15, 1998

INVENTOR(S)  :  YOSHIHIRO WADA

It is certified that error appears in the above-identified patent and that said Letters Patent is hereby corrected as shown below:

COLUMN 9

Line 5, procesing" should read --processing--.

COLUMN 10

Line 15, "but 5" should read --bus 5--.

COLUMN 12

Line 11, "in not" should read --is not--.

Signed and Sealed this

Sixteenth Day of November, 1999

Attest:

Q. TODD DICKINSON

*Attesting Officer*    *Acting Commissioner of Patents and Trademarks*